United States Patent
Itzkowitz

(10) Patent No.: US 12,215,898 B2
(45) Date of Patent: Feb. 4, 2025

(54) COOLING PRESSURE COOKER

(71) Applicant: The Steelstone Group LLC, Brooklyn, NY (US)

(72) Inventor: Binyumen Itzkowitz, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 658 days.

(21) Appl. No.: 16/743,560

(22) Filed: Jan. 15, 2020

(65) Prior Publication Data

US 2020/0224934 A1     Jul. 16, 2020

Related U.S. Application Data

(60) Provisional application No. 62/792,564, filed on Jan. 15, 2019.

(51) Int. Cl.
| | |
|---|---|
| *F25B 21/02* | (2006.01) |
| *A47J 27/00* | (2006.01) |
| *A47J 27/08* | (2006.01) |
| *F25D 17/06* | (2006.01) |

(52) U.S. Cl.
CPC ............ *F25B 21/02* (2013.01); *A47J 27/002* (2013.01); *A47J 27/08* (2013.01); *F25D 17/06* (2013.01)

(58) Field of Classification Search
CPC ......... F25B 21/02; F25D 17/06; A47J 27/002; A47J 27/08
USPC .......................................... 99/337, 403, 340
See application file for complete search history.

(56) References Cited

U.S. PATENT DOCUMENTS

| | | | |
|---|---|---|---|
| 2009/0152258 A1* | 6/2009 | Schandel | A47J 27/004 219/439 |
| 2014/0044851 A1* | 2/2014 | Kennedy | A47J 36/321 99/332 |
| 2014/0096687 A1* | 4/2014 | Evans | A47J 27/05 366/144 |
| 2016/0201018 A1* | 7/2016 | Watson | A47J 27/21083 426/11 |
| 2018/0028012 A1* | 2/2018 | Junge | A47J 27/004 |
| 2019/0269272 A1* | 9/2019 | Itzkowitz | A47J 36/321 |

FOREIGN PATENT DOCUMENTS

| | | | | |
|---|---|---|---|---|
| CN | 204015956 U | | 12/2014 | |
| EP | 1604156 B1 | * | 4/2011 | F25B 21/04 |
| KR | 101795310 B1 | * | 11/2017 | A47J 27/004 |

OTHER PUBLICATIONS

First Notification of Office Action issued for corresponding Chinese Patent Application No. 201920187960.1 dated Nov. 20, 2019 with an English translation.

* cited by examiner

*Primary Examiner* — Eric S Stapleton
*Assistant Examiner* — Yeong Juen Thong
(74) *Attorney, Agent, or Firm* — Myers Wolin, LLC

(57) ABSTRACT

An embodiment of the present disclosure provides a pressure cooker including: a housing; a pressure pot; and a cooling system. The pressure pot is disposed in the housing. The cooling system is thermally coupled to the pressure pot to cool the pressure pot.

10 Claims, 3 Drawing Sheets

COOLING PRESSURE COOKER

CROSS REFERENCES TO RELATED APPLICATIONS

This application claims the benefit of U.S. Provisional Patent Application No. 62/792,564 filed on Jan. 15, 2019. The disclosure and entire teachings of U.S. Provisional Patent Application 62/792,564 are hereby incorporated by reference.

FIELD

The present disclosure generally relates to a cooling pressure cooker.

BACKGROUND

A pressure cooker is used to form an air-tightened space in a cooker body by an airtight connection between the cooker body and the cover so that a temperature and pressure in the cooker can rise, resulting in shortening the cooking time.

Existing pressure cookers do not have a cooling function. In some cases, to prevent spoilage, a user has to put the food ingredients into the cooker shortly before the desired cooking time. However, to put the food ingredients into the cooker around the desired cooking time may not be convenient because, for example, the user is still at work at that time. Further, after cooking, the pressure cooker may be too hot to open and contents may be too hot to use.

SUMMARY

An embodiment of the present disclosure provides a pressure cooker including: a housing; a pressure pot; and a cooling system. The pressure pot is disposed in the housing. The cooling system is thermally coupled to the pressure pot to cool the pressure pot.

In another embodiment of the present disclosure, the housing includes an air inlet and an air outlet. The pressure cooker further includes: an air passage and a fan. The air passage is located in the housing such that heat of the pressure pot is transferred to an air in the air passage. The air passage is in communication with each of the air inlet and the air outlet. The fan that blows the air from the air inlet to the air outlet through the air passage In another embodiment of the present disclosure, the cooling system includes: a first heatsink, a second heatsink, and a heat transfer module. The first heatsink is configured to draw heat from the pressure pot. The second heatsink is configured to dissipate the heat into the air passage. The heat transfer module includes a cold side and a hot side. The cold side of the heat transfer module is thermally coupled to the first heatsink and the hot side of the thermoelectric module is thermally coupled to the second heatsink. The heat transfer module transfers the heat from the first heatsink to the second heatsink.

In another embodiment of the present disclosure, the heat transfer module includes a Peltier module.

In another embodiment of the present disclosure, the fan is disposed under a bottom of the pressure pot.

In another embodiment of the present disclosure, the pressure cooker further includes an air shroud defining a part of the air passage. The air shroud is disposed between the air passage and the pressure pot.

In another embodiment of the present disclosure, the air outlet includes a plurality of holes that are arranged in a circumferential direction of the housing.

DETAILED DESCRIPTION OF THE PREFERRED EMBODIMENTS

Figure 1:
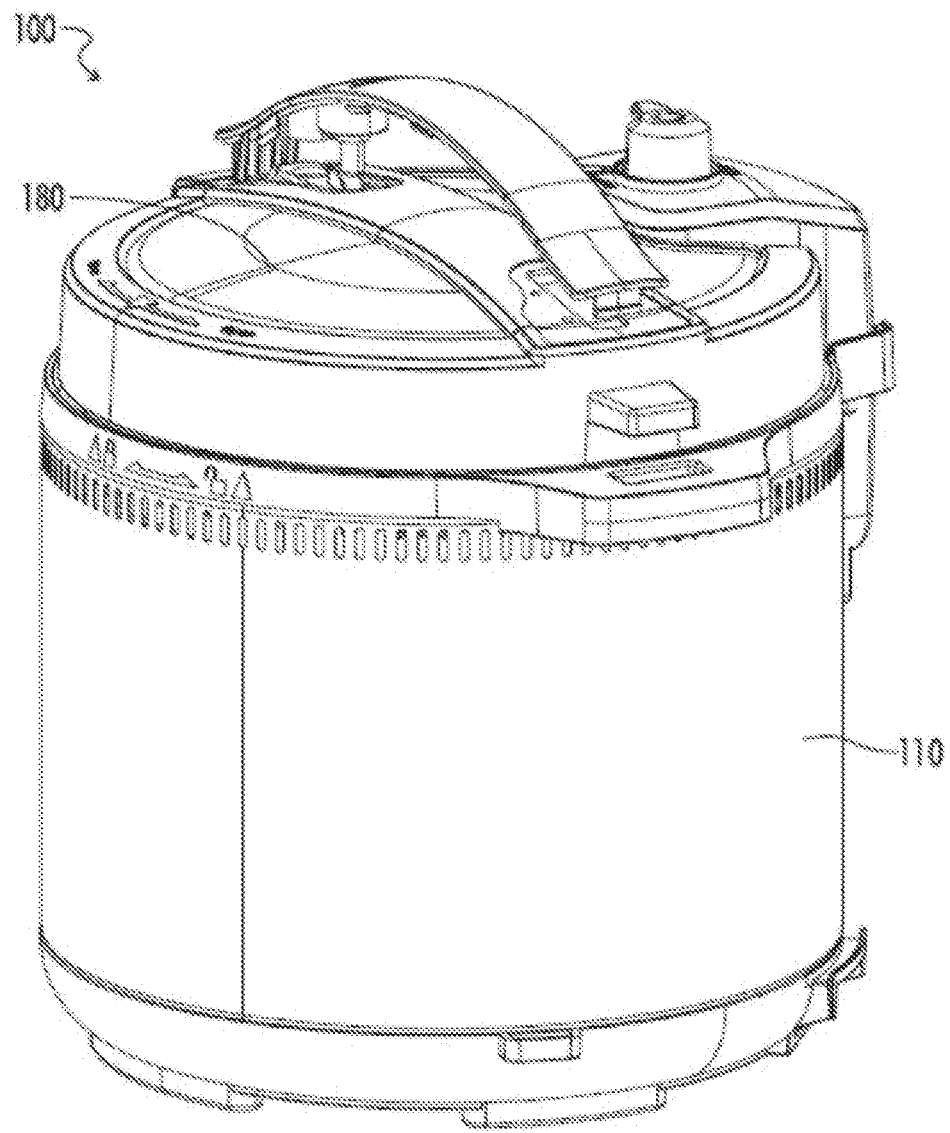
FIG. 1 illustrates a perspective view of a pressure cooker according to one embodiment.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible nonlimiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 2:
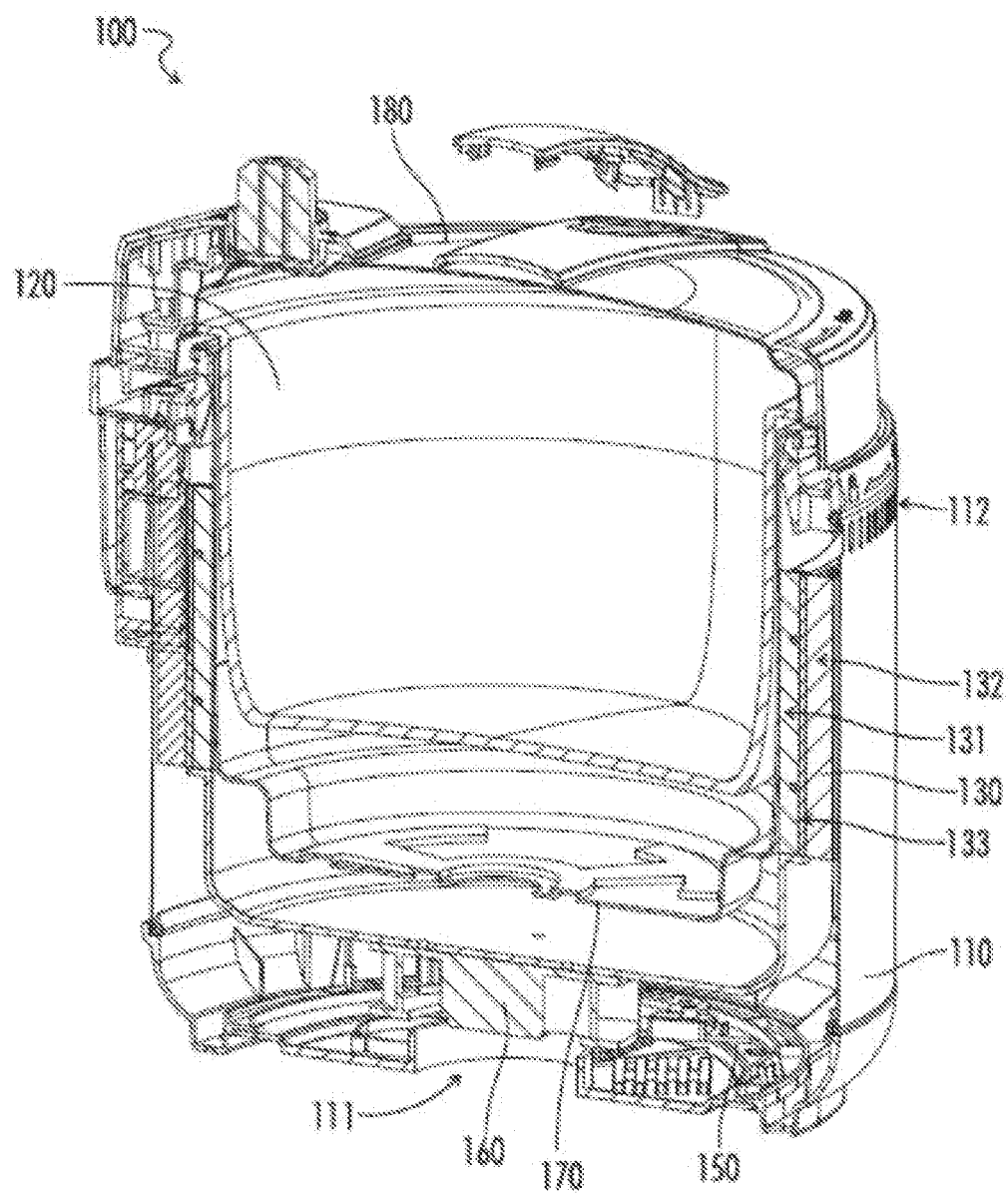
FIGS. 2-3 illustrate cross sectional views of a cooker according to one embodiment.
Figure 3:
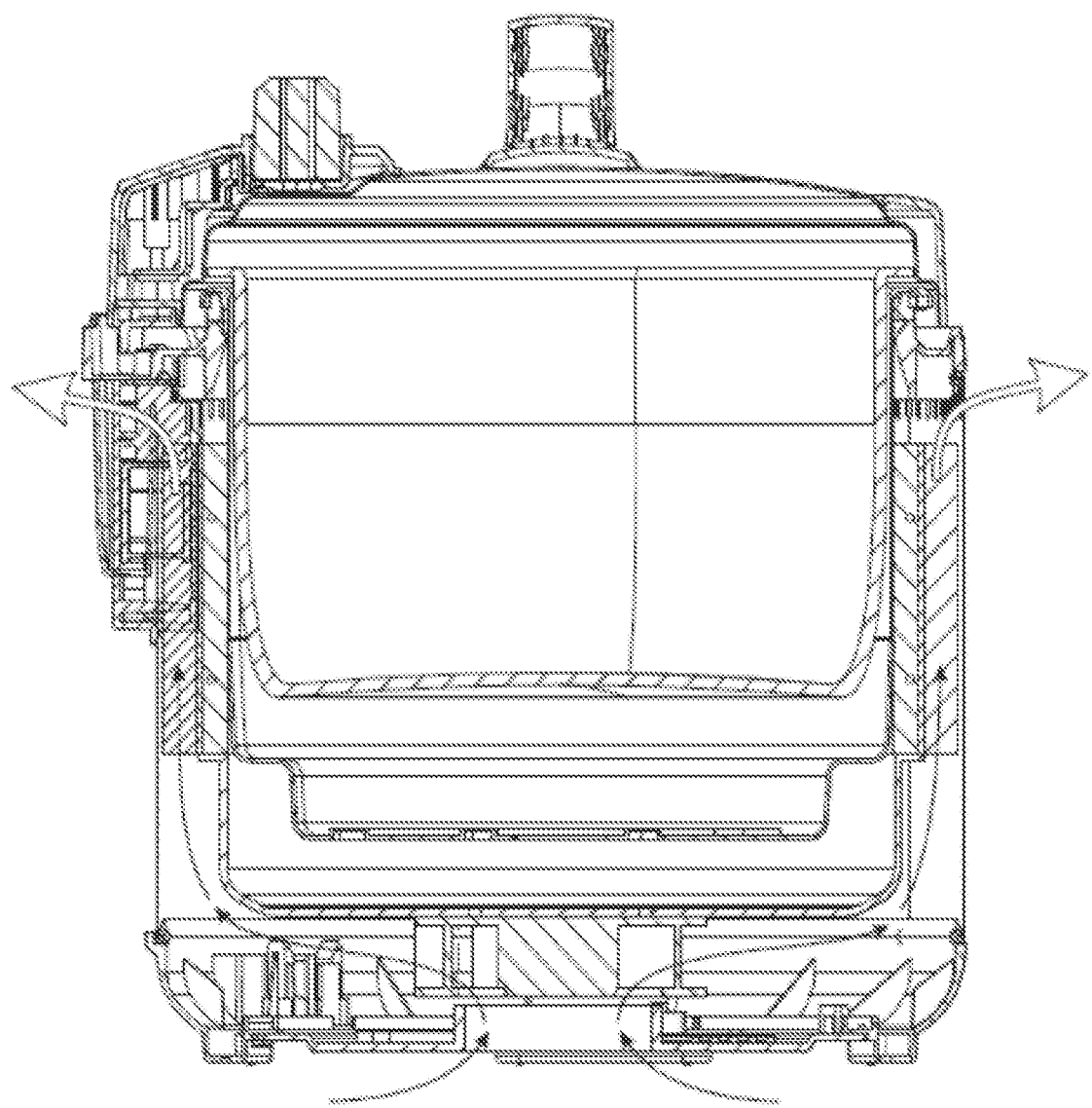

FIG. 1 illustrates a perspective view of a pressure cooker according to one embodiment. FIGS. 2-3 illustrate cross sectional views of a cooker according to one embodiment.

The pressure cooker 100 in FIGS. 1-3 may include a housing 110, a pressure pot 120, and a cooling system 130. As shown in FIGS. 2-3, the pressure pot 120 may be disposed in the housing 110. The cooling system 130 may be thermally coupled to the pressure pot 120 to cool the pressure pot 120. The cooling system 130 may be configured to cool the pressure pot 120 before cooking (e.g., to keep foods in the pot 120 cold to delay start time), after cooking (e.g., to cool foods in the pot 120, such as yogurt and any other foods), and/or during cooking (e.g., to effectively adjust temperature of foods in the pot 120). The pressure pot 120 may be configured to be covered and sealed by a lid 180. The pressure cooker 100 may further include a heater and a pressure sensor (both are not shown). The heater may heat the pressure pot 120. The pressure sensor may sense a pressure inside the pressure pot 120 such that the pressure inside the pressure pot 120 can be adjusted at a desired pressure.

As shown in FIGS. 2-3, the housing 110 may include an air inlet 111 and an air outlet 112. In a nonlimiting example of FIGS. 2-3, the air inlet 111 may be located at a bottom of the housing 110, and the air outlet 112 may be located at an upper side of the housing 110. In the present embodiment, the air outlet 112 may include a plurality of holes that are arranged in a circumferential direction of the housing 110. The configurations, including the locations, of the air inlet and the air outlet may not be limited to the configurations shown in FIGS. 2-3, and may be different from those in FIGS. 2-3.

Further, the pressure cooker 100 may include an air passage 150 and a fan 160. The air passage 150 may be located in the housing 110 such that heat of the pressure pot 120 is transferred to air in the air passage 150. In this embodiment, the heat of the pressure pot 120 may be transferred to the air in the air passage 150 via the cooling system 130. The air passage 150 may be in communication with each of the air inlet 111 and the air outlet 112. In an example of FIGS. 2-3, a part of the air passage 150 may be defined by an air shroud 170. The air shroud 170 may be disposed between the air passage 150 and the pressure pot 120.

The fan 160 may blow the air from the air inlet 111 to the air outlet 112 through the air passage 150. In one embodiment, the fan 160 may be disposed, for example, without limitation, under a bottom of the pressure pot 120.

In this embodiment, as shown in FIG. 2, the cooling system 130 may include a first heatsink 131, a second heatsink 132, and a heat transfer module (which may be referred to as a thermoelectric module) 133, and the cooling system 130 may be referred to as a thermoelectric cooler. The first heatsink 131 may be configured to draw heat from the pressure pot 120. The second heatsink 132 may be configured to dissipate the heat into the air passage 150. The heat transfer module 133 may include a cold side and a hot side. The cold side of the heat transfer module (or thermoelectric module) 133 may be thermally coupled to the first heatsink 131. The hot side of the heat transfer module (or thermoelectric module) 133 may be thermally coupled to the second heatsink 132. The heat transfer module 133 may transfer the heat from the first heatsink 131 to the second heatsink 132.

In the present embodiment, the heat transfer module 133 may include a Peltier module. When a DC electrical current is applied to leads of the Peltier, one side of the Peltier gets hot while the other side gets cold. In effect, the Peltier is 'sucking' the heat from the cold side and passing the heat on to the hot side. The Peltier keeps on taking the heat energy from the cold side and passing the energy to the hot side. The hot side then heats up and the heat must be removed. The heat may be dissipated from the hot side into the air passage 150. This way, the cold side can be kept cold, at a temperature below the atmosphere in the air passage 150.

The cold side of the Peltier may be attached to one or more heatsinks (e.g., the first heatsink 131), or in this case, sometimes referred to as coldsinks' because it is on the cold side of the Peltier. These coldsinks come into contact with (or in close proximity of) the pressure pot 120 containing the food and draw the heat out of the pot with food. This way the food can continuously be kept cold.

In this embodiment, a cooling air may be sucked into the air inlet 111 from underneath of the cooker 100. Then, the fan 160, such as a centrifugal fan, may force the cooling air into a bottom chamber of the cooker 100. In this embodiment, the air has nowhere to escape except through the heatsink 132. Then, the cooling air may be forced through the heatsink 132, absorbing heat and cooling off the heatsink 132. Then, heated air may exit from the air outlet 112 to an outside space of the cooker 100.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A pressure cooker comprising:
 a housing wherein the housing includes an air inlet and an air outlet;
 a pressure pot disposed in the housing;
 a thermoelectric cooler thermally coupled to the pressure pot to cool the pressure pot;
 an air passage located between the housing and the pressure pot, wherein the air passage is in fluid communication with each of the air inlet and the air outlet; and
 a fan configured to blow air from the air inlet to the air outlet through the air passage, wherein the air passage is located between the housing and the pressure pot, wherein heat of the pressure pot is transferred via the thermoelectric cooler to the air in the air passage,
 wherein the housing includes a bottom, and a sidewall extending upwardly from the bottom of the housing,
 wherein the pressure pot includes a bottom, and a sidewall extending upwardly from the bottom of the pressure pot,
 wherein at least a part of the thermoelectric cooler is disposed between the sidewall of the housing and the sidewall of the pressure pot, and
 wherein the fan is configured to discharge the air through an outlet oriented in a direction parallel to the bottom of the pressure pot such that the air flow changes direction to flow upwardly between the sidewall of the housing and the sidewall of the pressure pot, through the thermoelectric cooler.

2. The pressure cooker of claim 1, wherein the thermoelectric cooler includes:
a first heatsink configured to draw heat from the pressure pot;
a second heatsink configured to dissipate the heat into the air passage; and
a heat transfer module including a cold side and a hot side;
wherein the cold side of the heat transfer module is thermally coupled to the first heatsink and the hot side of the heat transfer module is thermally coupled to the second heatsink, and the heat transfer module transfers the heat from the first heatsink to the second heatsink.

3. The pressure cooker of claim 2, wherein the heat transfer module comprises a Peltier module.

4. The pressure cooker of claim 1, wherein the fan is disposed under the bottom of the pressure pot.

5. The pressure cooker of claim 1, wherein the air outlet includes a plurality of holes arranged in a circumferential direction of the housing.

6. The pressure cooker of claim 2, wherein the first heatsink includes a part disposed between the sidewall of the pressure pot and the second heatsink, and the second heatsink includes a part disposed between the first heatsink and the sidewall of the housing.

7. The pressure cooker of claim 1, wherein the thermoelectric cooler extends along both the sidewall of the housing and the sidewall of the pressure pot.

8. The pressure cooker of claim 1, wherein an uppermost end of the thermoelectric cooler is located lower than a lowermost end of the air outlet and is located higher than the bottom of the pressure pot.

9. The pressure cooker of claim 1, wherein at the position that is upper than the bottom of the pressure pot and that is between the sidewall of the housing and the sidewall of the pressure pot, the air has nowhere to escape except through the thermoelectric cooler.

10. The pressure cooker of claim 1, wherein the thermoelectric cooler extends across the bottom of the pressure pot in a side view of the pressure cooker.

* * * * *